United States Patent [19]

Stenvall

[11] 4,365,704

[45] Dec. 28, 1982

[54] LOG ALIGNMENT APPARATUS

[76] Inventor: Carl-Johan Stenvall, 5264 Sikfors, Älvsbyn, Sweden, S-942 00

[21] Appl. No.: 200,404

[22] Filed: Oct. 24, 1980

[30] Foreign Application Priority Data

Oct. 29, 1979 [SE] Sweden ............................. 7908741

[51] Int. Cl.³ ............................................ B65G 47/24

[52] U.S. Cl. ..................................... 198/395; 83/367; 144/209 H; 144/356; 414/757

[58] Field of Search .............. 198/394, 395, 401, 411; 83/367, 708–712, 704; 144/312, 309 R, 209 A; 414/431, 433, 745, 748, 757

[56] References Cited

U.S. PATENT DOCUMENTS

| | | | |
|---|---|---|---|
| 1,928,811 | 12/1933 | Burns | 83/704 X |
| 4,127,044 | 11/1978 | Kenyon | 144/312 |
| 4,139,035 | 2/1979 | Bystedt et al. | 83/367 |
| 4,147,259 | 4/1979 | Nilsson | 144/312 |

*Primary Examiner*—John J. Love
*Assistant Examiner*—Douglas D. Watts
*Attorney, Agent, or Firm*—Burns, Doane, Swecker & Mathis

[57] ABSTRACT

An apparatus for automatically aligning logs to be sawn in a sawing machine in a position for yielding an optimum sawing result, comprising an arrangement for carrying the log to be aligned in a predetermined vertical longitudinal plane through the sawing machine, and a device for turning the log. The apparatus further comprises sensing members, which are connected to an evaluation which, control unit and by external sensing the log by the sensing members, records changes of the log center in relation to the longitudinal plane during one revolution of the log. Thereafter, the unit on the basis of information received determines the optimum alignment position and permits the turning device to turn the log into this position.

7 Claims, 6 Drawing Figures

LOG ALIGNMENT APPARATUS

BACKGROUND OF THE INVENTION

This invention relates to an apparatus for automatically aligning logs to be fed into a block sawing machine. At log sawing it is of great importance that the logs prior to their feed into the sawing machine are aligned and positioned so that optimum results and wood yield are obtained. Heretofore logs substantially have been aligned manually by turning them to a position, which visually had been deemed most favorable for producing the greatest possible wood yield. This alignment work, however, has proved not only to involve high physical strain but also to require a very good judgement and long experience. Due to the physical strain, however, even the most experienced staff has difficulties in permanently making optimum judgements. Therefore, it has long been a desire that a more or less automatic machine should be available which aligns the logs and eliminates at least the heavy and difficult operations.

An automatic apparatus for aligning blocks, it is true, is known previously, but this apparatus does not work unless at least one side of the object to be aligned is sawed plane and, therefore, this known apparatus cannot be used for aligning logs.

The object of the present invention, therefore, is to provide an apparatus for aligning logs which apparatus is so constructed that it fully automatically aligns every log to be fed into a sawing machine and thereby not only eliminates the heavy and difficult operations, but also saves labour and simultaneously improves the yield and increases the efficiency.

BRIEF DESCRIPTION OF THE DRAWINGS

The invention is described in greater detail in the following, with reference to the accompanying drawings, in which.

DETAILED DESCRIPTION OF THE PREFERRED EMBODIMENTS

Figure 1:
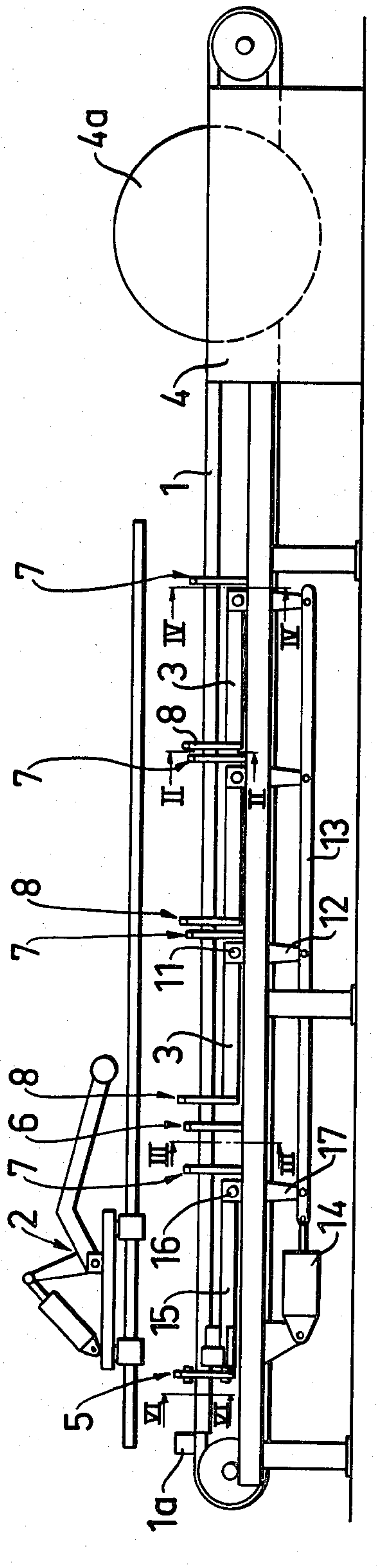
FIG. 1 is a schematic lateral view of a log aligning apparatus according to the invention.
Figure 2:
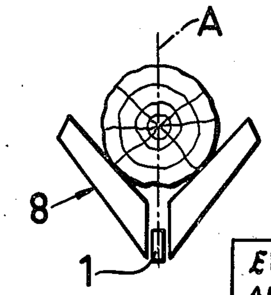
FIG. 2 is a schematic view of a section substantially along the line II—II in FIG. 1.

With reference to FIG. 1, a feed chain 1, which is located in a feed bench is provided with drivers 1*a* for feeding a log into a sawing machine 4. Said machine comprises at least two saw blades 4*a*, which are movable in lateral direction for being adjusted relative to the predetermined vertical longitudinal central plane of the sawing machine, which plane coincides with the vertical longitudinal central plane A of the feed bench. During the in-feed operation every log is retained by a log holder 2, which is located above the feed chain 1 and can be of any per se known design. The holder, therefore, is not described here. Prior to its feed into the sawing machine 4, however, the log must be aligned and positioned for rendering the optimum result and wood yield.

According to the present invention, therefore, the feed bench is equipped with a plurality of upwardly open V-shaped yokes 8, which are arranged symmetrically in relation to the vertical longitudinal central plane A of the bench and spaced from each other along the bench for receiving and carrying the log to be fed into the sawing machine 4. The yokes 8 are supported each by an arm 3, which can be lifted and lowered and is pivotally mounted in the feed bench at 11, and which via a joint 12 is connected rigidly to a pull rod 13 being common for all yokes 8 and coupled to a cylinder and piston 14. With the cylinder and piston 14, thus, the yokes can be lifted and lowered simultaneously. The feed bench further comprises a device 5, which as shown consists of two conveyors 5*a* arranged in V-shape and driven in the same direction for turning a log applied on said yokes 8 and said conveyors 5*a*. The turning device 5 is lifted and lowered in the same way as the yokes 8, i.e. by an arm 15, which is mounted on the feed bench at 16 and via a joint 17 rigidly connected to the pull rod 13 of the yokes. The turning device, thus, is liftable and lowerable simultaneously with the yokes 8.

The log aligning apparatus according to the invention further comprises a plurality of sensing members 6 and 7, which in spaced relationship are arranged in the feed bench and capable of sensing how a log supported by the yokes 8 and turning device 5 changes its centre in relation to the vertical central plane A of the feed bench while it is being turned through an entire revolution by said turning device 5. The sensing members 7, more precisely, are arranged to sense the change in lateral direction, and the sensing members 6 are arranged for sensing the change in vertical direction, i.e. whether the log curve faces upward or downward. Each of the sensing members 6,7 are coupled to a respective potentiometer 9 and 10, which are connected in series in a loop or circuit to a computer or similar device (not shown) for evaluation of information received from the sensing members 6,7. Thereafter on the basis of the evaluation result the computer causes the turning device 5 to turn the log to a position providing the optimum wood yield, in which position a curved log shall be located with the curve upward and with its centre in the central plane A of the feed bench.

Each sensing member 7, more precisely, comprises two sensing arms 7*a*, which are located symmetrically in relation to the central plane A of the feed bench and interconnected for simultaneous movement. Said sensing arms 7*a* are actuated toward each other by a force exerting device 18 acting at least on one sensing arm, which device causes the sensing arms 7*a* to tend to always move toward one another to a starting position, in which the resistance of the potentiometer connected to the respective sensing member 7 is the lowest, whereby at least one of said sensing arms 7*a* always is held abutting the log side. When the log is being turned, the sensing arms 7*a* in the case of a curved log are moved apart or away from each other when the log with its centre B moves from the vertical central plane A, and are moved toward each other when the log with its centre B moves toward said central plane. The movement or deflection of said sensing arms is transferred to the potentiometer 10 of the sensing member, in such a manner that this potentiometer increases its resistance when the sensing arms 7*a* are moved apart and decreases its resistance when the sensing arms 7*a* move toward each other. The lowest resistance, thus, is obtained when the log with its centre B passes the vertical central plane A of the feed bench.

The sensing member 6, which senses whether the log curve faces upward or downward, comprises two sensing arms 6*a*, which are located symmetrically in relation to the central plane of the feed bench and interconnected for simultaneous movement. The sensing arms 6*a* like the sensing arms 7*a* are actuated toward each other by a force exerting device 19, which acts at least on one sensing arm 6*a* and, thus, causes the sensing arms 6*a* to tend to always move toward each other to a starting position, in which the resistance of the potentiometer 10 connected to this sensing member is the lowest. The sensing arms have contact surfaces 7*b* inclined toward each other, against which the log is intended to abut. Upon turning of the log, it presses apart the sensing arms 6*a* when it with its centre B moves downward from above, and permits the sensing arms 6*a* to move toward each other when the log with its centre B moves upward from below. This movement or deflection of the sensing arms is transferred to the potentiometer 9 of the sensing member, so that the potentiometer increases its resistance when the sensing arms 6*a* are moved apart, and decreases its resistance when the sensing arms 6*a* move toward each other. The lowest resistance, thus, is obtained when the curve of the log faces upward, and the centre B is located in the vertical central plane A of the feed bench.

The potentiometers 9,10 of the sensing members 6,7 being connected in series, different resistance values are obtained during the revolution of the log and fed into the computer. But of these values it is only one, the lowest one, which indicates the optimum alignment position for the log. When the log has been turned through one revolution, thus, the computer knows how the log is to be aligned for yielding the optimum sawing result, and it permits the turning apparatus 5 to turn the log until the computer again records the lowest resistance value previously obtained. The computer then stops the turning of the log. The alignment of the log thereby is completed, and the log can be fed into the sawing machine 4, possibly subsequent to a necessary lowering of the yokes 8 and to a switch-in of the log holder 2.

Instead of the sensing members 6,7 described above and shown in the drawings, it is possible within the scope of the invention to use optical scanners, although this is not shown. Said optical scanners may be photocells arranged in vertical ramps in tightly spaced relationship for scanning in vertical direction, and in horizontal ramps for scanning in lateral direction. By recording in relation to predetermined reference planes the number of photocells switched on and off by the log while being turned through one revolution, it is, thus, possible to determine the optimum alignment position for the log to be fed in.

Figure 3:
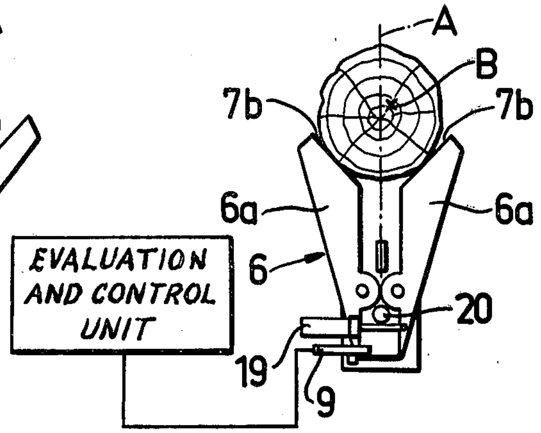
FIG. 3 is a schematic view of a section substantially along the line III—III in FIG. 1.
Figure 4:
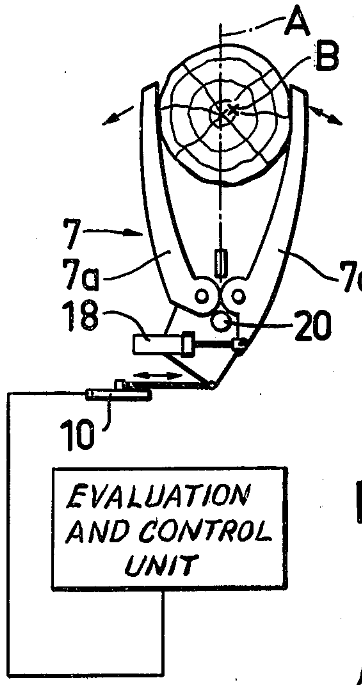
FIG. 4 is a schematic view of a section substantially along the line IV—IV in FIG. 5.
Figure 5:
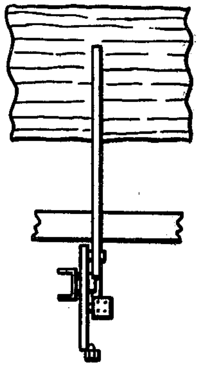
FIG. 5 is an end view of what is shown in FIG. 4.
Figure 6:
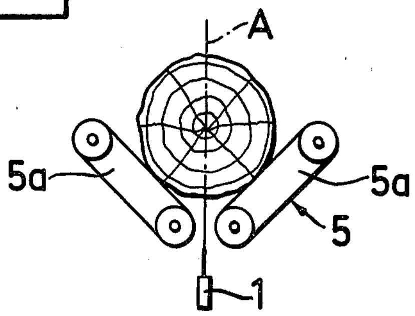
FIG. 6 is a section substantially along the line V—V in FIG. 1.

Each sensing member 7 and preferably also sensing member 6 advantageously can be pivotal about a pivot 20 located in the vertical central plane A as shown in FIGS. 4 and 3, whereby the two sensing arms in each sensing member 7,6 normally are held in abutment to the log. By recording in the potentiometer 10,9 the pivotal motion of the sensing arms about the pivot 20, thus, the deflection transferred to the potentiometer is reduced very substantially, especially in cases when one and/or the other sensing arm in a sensing member during the turning of the log meets a projection from a knot remainder on the log.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. An apparatus for automatically aligning logs to be fed into a sawing machine for being sawn in relation to a predetermined vertical longitudinal plane through the sawing machine, the apparatus comprising members for carrying a log in said vertical longitudinal plane, a device for turning the log, sensing members connected to an evaluation and control unit, said sensing members being capable by outside sensing of the log to record in said unit any change of the log center in relation to said longitudinal plane during a turning of the log through one revolution, at least one of said sensing members being arranged for sensing the change of the log center in a vertical direction, at least one of the remaining sensing members being located in spaced relationship with respect to the at least one vertical sensing member and being arranged for sensing the change of the log center in a lateral direction in relation to the vertical longitudinal plane, each of the sensing members comprises two sensing arms arranged symmetrically in relation to the vertical longitudinal plane and interconnected for simultaneous movement, said arms being urged into abutting engagement with the log for sensing the same, and said unit on the basis of information obtained from the sensing members determines the optimum alignment position and permits the turning device to turn the log into the optimum alignment position.

2. The apparatus as defined in claim 1, wherein movement of the sensing arms imparted to the arms by the log during turning of the log is transferred to a potentiometer, the resistance of the potentiometer increasing with increased movement of the sensing arms.

3. The apparatus as defined in claim 2, wherein each sensing member includes a potentiometer, said potentiometers being connected in series in a circuit connected to the evaluation and control unit.

4. The apparatus as defined in claim 2 or 3, wherein the sensing arms of the sensing member for sensing the change of the log center in vertical direction are formed with surfaces inclined toward each other and abutting the log substantially from below such that the sensing arms move apart when the log center during the turning moves downward from above and move toward each other when the log center moves in the opposite direction, the potentiometer of said sensing member being coupled to the sensing arms such that the potentiometer resistance increases when the arms move apart and said resistance decreases when the arms move toward each other.

5. The apparatus as defined in claim 1, wherein the turning device consists of two conveyors arranged in V-shape and driven in the same direction, said conveyors being arranged symmetrically each on one side of the vertical longitudinal plane.

6. The apparatus as defined in claim 1, wherein the members for carrying the log to be aligned comprise a plurality of spaced, upwardly open V-shaped yokes, a point end of the yokes being located in the vertical longitudinal plane.

7. The apparatus as defined in claim 5 or 6, wherein the turning device and the members for carrying the log to be aligned can be lifted and lowered.

* * * * *